Patented Oct. 26, 1943

2,332,802

UNITED STATES PATENT OFFICE

2,332,802

ANIMAL PROTEIN RESIN PRODUCT AND PREPARATION THEREOF

Carl S. Leonardson and Donald J. White, Seattle, Wash., assignors to The Borden Company, New York, N. Y., a corporation of New Jersey No Drawing. Application May 3, 1940, Serial No. 333,246

14 Claims. (Cl. 260—6)

This invention relates to resin type reaction products of an animal protein with urea and formaldehyde that are especially suitable for use as wood glues, but that may be used also as sizing or finishing materials for wood, cloth, paper and the like, and to methods of preparing and using such reaction products.

Urea-formaldehyde resin glues have been used heretofore for gluing wood in the manufacture of plywood and the like. Such glues are condensation products known as resin glues and are usually marketed as aqueous solutions containing about 60% solids and having a viscosity at 70° F. of about 125 R. P. M. taken on a Stormer viscosimeter using a 500 gram weight. During the condensation of urea and formaldehyde, the product gradually becomes more and more viscous as the reaction proceeds. In order to obtain the required viscosity in the product for wood gluing, however, it is necessary to evaporate water from the material at some stage during the condensation, or after the condensation is completed. If the condensation of a straight urea-formaldehyde product is carried out without evaporating water, the product forms an irreversible gel before a Stormer viscosity of 125 R. P. M. is reached. The usual practice, therefore, in order to obtain a final product having the requisite viscosity and useful life, has been to arrest the reaction well before the final viscosity has been reached and then to remove rapidly a relatively large amount of water, usually by evaporation under reduced pressure. This procedure necessarily gives a final product containing a relatively large amount of solids and increases the cost of the product.

These glues can be stored at a temperature of 70° F. or lower for fairly long periods of time but they become gradually thicker until at last, the product changes into a gel that is useless as a glue. Temperature has a marked effect on this useful liquid life of the resin glues, however, and serious problems are presented when it is necessary to store the glues in southern climates because the glues gel much more rapidly when stored at temperatures above 70° F.

When these glues become too thick, they can be thinned out to some extent by the addition of water if a gel has not formed, but the addition of even small quantities of diluting water have an extremely marked effect on the viscosity. For example, a urea-formaldehyde resin glue with a solids content of 60% and a Stormer viscosity of 87 will, when diluted with water to a solids content of 50%, have a Stormer viscosity of 600. Too much water cannot be added for thinning purposes, however. For example, the addition of four parts of water to such a glue will precipitate most, if not all, of the resinous material.

As a urea-formaldehyde resin glue is diluted with water and it becomes thinner, its bonding strength and also its general value as a glue for holding veneers of wood together is diminished. For example, veneers glued together under a standard hot pressing procedure with each of the above urea-formaldehyde resin glues of 60% and 50% solids contents, respectively, gave the following results when the usual strength tests made in testing plywood in a Riehle testing machine were carried out. In each case, the same amount of glue on a dry basis was spread on the wood veneers.

Table I

| Type of glue | Viscosity | Dry strength | Wet strength |
|---|---|---|---|
| 60% solids glue | 87 | 215-90 | 190-60 |
| 50% solids glue | 600 | 155-45 | 140-25 |

The first figure in each of the above tests indicates the strength of the plywood strips that were broken in a Riehle testing machine. The second figures after the hyphens in the results given above in each case indicate the percentage of broken fibre that appeared on the broken test piece. The wet shear tests were made after the plywood strips had been soaked in cold water for 48 hours.

It will be apparent from this example that with the straight urea-formaldehyde resin glues, the strength of the glue for purposes of gluing wood veneers together in making plywood diminishes rapidly as the glue is thinned out by dilution with water. In addition, the glue loses the desired spreading qualities as it is diluted and becomes thinner.

It is an object of our invention to provide a urea-formaldehyde type of resin product having the viscosity and consistency required for wood gluing operations which can be prepared without evaporating water from the product at any stage of its preparation, thereby producing a final product containing substantially smaller quantities of solids than are present in the usual straight urea-formaldehyde resin glues.

Another object of the invention is to provide such a resin having good spreading qualities and a low solids content that also has a high bonding strength.

A further object is the provision of such a urea-formaldehyde type resin having a long useful life when stored at room temperature together with an unusually long life for such a product when stored at higher temperatures.

Another object is to provide a urea-formaldehyde type of resin to which large quantities of water can be added without precipitating the resinous material.

Another object is to provide such a resin which can be used for gluing veneers of wood together to make plywood, and which, after setting, furnishes a more flexible or less brittle glue film.

Another object is the provision of methods of making and using these new resin type adhesives having one or more of the foregoing advantageous properties.

Other objects and advantages will be apparent or will be explained in conjunction with the following description of various embodiments of the invention.

We have discovered that animal proteins known as "water soluble" proteins such as the albumins or albuminoids, dried blood, blood albumen, hide glue, bone glue, fish glue or materials consisting principally of such animal proteins as fish meal or collagen, may be condensed with a urea and formaldehyde without evaporating water during or after the condensation to provide resinous products fully satisfying the requirements of an excellent wood glue. Glues prepared in this manner are thermo-setting and have fully as good and frequently better bonding strengths than straight urea-formaldehyde resin glues, although containing substantially smaller amounts of solids. These new glues, in addition, will remain in solution in a liquid condition at 70° F. for several months, have a longer useful life than the usual straight urea-formaldehyde glues when stored at higher temperatures, can be diluted with large quantities of water if desired, can be dried, as by any of the well known spray drying processes, and thereafter can be mixed easily with water to produce a satisfactory glue.

Any of the usual diluting agents or extenders, such as the cereal flours, wheat flour, rye flour and starch as well as other materials useful with straight urea-formaldehyde glues may be mixed with glues of this invention after they have been prepared. In fact these animal protein-urea-formaldehyde glues may be mixed with unusually large amounts of extenders or filler materials and still provide adequate bonding strength for use in making plywood.

These reaction products are prepared according to this invention by condensing in aqueous solution one or more of the "water soluble" animal proteins with a urea and formaldehyde. The condensation reaction is carried out by heating the mixture of ingredients to a suitable condensing temperature of around 200° F. or slightly higher until a product having the desired viscosity is obtained, and it is unnecessary to evaporate water during the condensation, or after it has been completed.

The solution of animal protein may be formed by simply stirring the protein into cold or warm water, or by boiling the protein material in water as may be expedient. With protein materials that are somewhat difficult to get into solution, it is convenient to expedite the dissolving of the protein by adding some or all of the urea to the water used for preparing the solution.

When the solution of protein is ready, this may be mixed with the formaldehyde and with urea, if additional urea is needed, and the pH of the mixture adjusted to approximately 7. A solution of a suitable alkali such as caustic soda or potash, soda ash, etc., may be added for this purpose.

The substantially neutral mixture of the three ingredients may now be heated to a condensing temperature, preferably in a suitable refluxing apparatus, and after a few minutes, the pH, which has then dropped somewhat, may be further adjusted by addition of a weak acid to about 5.5. This second pH adjustment is not essential but the condensation should be carried out under slightly acid conditions. If too low a pH is employed, however, the reaction is so rapid that it may be difficult to control. The heating is then continued, preferably without any further interruption until the product has almost reached the desired viscosity, and the product is then neutralized and cooled to room temperature to arrest the condensation.

The point at which to neutralize and cool the product may be determined by obtaining samples of the product from time to time and testing them for viscosity. Keeping in mind that the reaction is proceeding while such a sample is being cooled and tested and also while the main body of the product is being cooled, an allowance should be made in selecting the viscosity of the sample tested which will produce the desired viscosity in the final product. Usually the reaction is stopped in time to obtain a final cooled product having a viscosity of about 50 to 200 R. P. M. on a Stormer viscosimeter using a 500 gram weight with the glue at 70° F. While this is a preferred range of viscosity for the final product, it is to be understood that the reaction may be stopped to obtain a higher or lower final viscosity if desired. When the product is neutralized to arrest the condensation, sufficient alkali is usually added to the product to render it slightly alkaline with a pH, for example, of about 7 to 8.5.

The term "a urea," as employed in the specification and claims, is intended to include the chemical compound $NH_2.CO.NH_2$ and other ureas such as phenyl urea and thiourea, known to react with formaldehyde by condensation. The terms "aldehyde" and "formaldehyde," as used in the specification and claims, are intended to include the various aldehydes that are suitable for producing resins by condensation with urea, such as paraformaldehyde and other polymers of formaldehyde, and formaldehyde liberating compounds. The proportions of protein to urea and formaldehyde may be varied within rather wide limits as will be apparent from the examples given below. While the invention is not limited thereto, it is preferable to employ about 10 to 100 parts of protein or protein rich materials for each 100 parts of the urea. The proportion of urea to formaldehyde may be varied as will be understood by those skilled in the art, good results being obtained by using a mol ratio of about 1 mol of the urea to about 1.7 to 2.2 mols of formaldehyde.

By way of illustration and without limiting the invention in any way, the following examples of the preparation of animal protein-urea-formaldehyde reaction products according to the invention are given.

*Example I*

In a suitable mixing kettle with a slow moving agitator there is placed 50 lbs. of cold water and 25 lbs. of dried blood albumen. The mixer is started and the agitation continued until a complete or a substantially complete solution of the blood albumen is obtained. Into a reaction kettle, preferably equipped with a stirrer and a reflux condenser, there is placed 270 lbs. of formaldehyde containing from 37 to 40% free formaldehyde, and 100 lbs. of urea. The agitator in the reflux kettle is started and the urea preferably dissolved in the formaldehyde before the addition of the above referred to blood albumen solution. After the blood albumen solution has been added and mixed thoroughly into the material in the kettle, a determination of the pH of the resulting mixture is made and a sufficient amount of a water soluble alkaline material is added to bring the mixture to a substantially neutral point or to a pH of about 7. Caustic soda, caustic potash or trisodium phosphate are good examples of the neutralizing agent that may be used. After the adjustment of the pH of the solution has been made, steam is turned into the jacket of the kettle, and its contents heated to about 209° F. The temperature is held at about this point during the reaction and while the reaction is going on it is preferable to let any vapors that condense in the condenser, return through the reflux condenser to the kettle.

After the chemical reaction has continued for about 15 or 20 minutes, a sample of the liquid is removed from the kettle and the pH again determined. The pH may now be about 6 or 6.5. In any case, the pH is adjusted with an acid such as weak solution of formic acid, acetic acid, phosphoric acid or the like so that the contents of the kettle will have a pH of about 5.5. Thereafter, the heating is continued and the solution is held at about 209° F. until a sample of the material shows a viscosity on a Stormer viscosimeter with a 500 gram weight and with the glue at 70° F., of approximately 200 R. P. M.

When this viscosity or approximately this viscosity is reached, the solution is neutralized with any suitable alkaline material such as caustic soda, to a pH, preferably from 7.0 to 8.5. After this final pH adjustment, the resulting glue is preferably cooled by any suitable means to about 70° F. This may be done by a cooling jacket on the kettle or in any other desirable manner. It is not entirely essential that the cooling should be done before packing the material but it is preferable to cool first. The resulting glue is of a uniform consistency, has a Stormer viscosity of about 125 R. P. M., possesses a good flowing quality and contains approximately 45% solids.

*Example II*

50 lbs. of dried blood is dissolved in 100 lbs. water and then reacted with 270 lbs. formaldehyde and 100 lbs. urea, following the procedure given in Example I. The resulting glue contains approximately 41% solids.

*Example III*

25 lbs. of bone glue are added to 50 lbs. of cold or warm water, allowed to soak for 15 or 20 minutes and thereafter heated, while slowly stirring, to completely dissolve the glue in the water. 120 or 130° F. is a suitable temperature to employ in preparing this solution. When the glue is completely dissolved in the water, this solution is reacted with 270 lbs. of formaldehyde and 100 lbs. of urea following the procedure described under Example I. The resulting glue contains approximately 49% solids.

*Example IV*

50 lbs. bone glue is dissolved in 100 lbs. water, and this solution is reacted with 270 lbs. of formaldehyde and 100 lbs. of urea according to the procedure described in Example III. The resulting glue contains approximately 40% solids.

*Example V*

50 lbs. of cold water are placed in a jacketed mixing kettle fitted with an agitator. 25 lbs. of commercial fish meal are added to the water together with 25 lbs. of urea and this mixture is stirred and gradually heated to about 120 or 130° F., when the fish meal becomes substantially dissolved and probably reacts with the urea. The mixture is then placed in the reaction kettle together with 270 lbs. of formaldehyde and 75 lbs. of urea and the glue is then prepared according to the procedure described in Example I.

*Example VI*

50 lbs. of cold water are placed in a jacketed mixer fitted with an agitator and 25 lbs. of ground collagen (decalcified bone) are added to the water, the agitator in the mixer is started and 25 lbs. of urea added. Steam is turned into the jacket to assist in dissolving the collagen and it is preferable to heat the mixture by means of the steam jacket on the kettle to about 120 to 140° F., or even somewhat above this temperature if desired, to assist in substantially dissolving the collagen in the presence of the water and urea. After this collagen is substantially dissolved, 270 lbs. of formaldehyde and 75 lbs. of urea are placed in the reaction kettle and the entire amount of prepared collagen-water-urea mixture is added and mixed in. This final mixture is then reacted to produce a glue following the procedure given in Example I.

A comparison of the strength and bonding qualities of glues prepared according to this invention with commercial urea-formaldehyde resin glues is given in the following tables. The tests carried out to obtain the data in these tables were made by gluing 1/10" fir veneers together to form plywood. A prepared liquid glue was spread on both sides of a center or core veneer to obtain about 54.8 lbs. of liquid glue per 1000 square feet of double glue line veneer. The face and back veneers were then laid on the glue spread center veneer and the three veneers pressed together in a hot plate press. The plywood was then removed from the press and allowed to thoroughly season, after which it was cut into small pieces for test purposes, tests being made with a series of dry strips on a Riehle testing machine, and another series of tests being made with strips that had been soaked in cold water for 48 hours.

*Table II*

| Type of glue | Solids content of glue | Dry strength | Wet strength |
| --- | --- | --- | --- |
| | Per cent | | |
| A. Commercial urea-formaldehyde | 62 | 280–80 | 230–45 |
| B. Example I | 45 | 250–90 | 220–40 |
| C. Example IV | 40 | 270–80 | 200–30 |
| D. Glue A 100 parts+50 parts rye flour+50 parts water | 56 | 255–90 | 215–25 |
| E. Glue B 100 parts+50 parts rye flour+50 parts water | 50.5 | 265–85 | 210–20 |
| F. Glue C 100 parts+50 parts rye flour+50 parts water | 45 | 240–90 | 220–25 |

The foregoing table offers a comparison of glues of substantially the same viscosities and it is apparent that the glues of this invention provide at least as good, if not superior, bonding strengths in spite of their lower solids contents at the viscosities normally employed. The following table indicates the decidedly inferior strengths obtained when commercial urea-formaldehyde glues are diluted to the same solids content as the glues of this invention. In addition to the lower strengths obtained with the diluted glues, these diluted glues were rendered so thin as to be unsuitable commercially for spreading.

*Table III*

| Type of glue | Solids content of glue | Dry strength | Wet strength |
|---|---|---|---|
| G. Commercial urea-formaldehyde +water | Per cent 50 | 155–45 | 140–25 |
| H. Example I | 45 | 250–90 | 220–40 |
| I. Commercial urea-formaldehyde +water | 40 | 170–80 | 160–55 |
| J. Example IV | 40 | 270–80 | 200–30 |
| K. Glue G 100 parts+50 parts rye flour+50 parts water | 50 | 185–80 | 130–15 |
| L. Glue H 100 parts+50 parts rye flour+50 parts water | 50.5 | 265–85 | 210–20 |

In using the above glues for hot plate pressing, 1 lb. of a hardening agent was added to each 100 lbs. of the resin glue. Ammonium chloride is suitable for this purpose and various other hardening agents of the type well known in the art, such as ammonium sulfate, sodium bisulfate, zinc chloride or other acidic salts can be used with glues prepared according to this invention, as well as with the usual urea-formaldehyde resin glues. The percentage of such hardening agents used in the liquid glue will, as is well known, alter to a considerable extent the speed of setting of the glue as soon as the hardening agent has been added.

Glues prepared according to this invention may be used also in the method of making plywood commonly known as "coldpressing" by the addition of a somewhat larger amount of the hardening agent. For example, with 2 lbs. of ammonium chloride to each 100 lbs. of liquid glue, glues prepared according to this invention may be spread on veneers at the rate of 60 lbs. of liquid glue per 1000 sq. feet double glue line, and the veneers then pressed at 150 lbs. pressure for 24 hours at room temperature. The following table offers a comparison of strengths of plywood glued by cold pressing using glues of substantially the same solids contents. 2% of ammonium chloride was added as the hardening agent to each of the glues tested.

*Table IV*

| Type of glue | Solids content of glue | Dry strength | Wet strength |
|---|---|---|---|
| M. Commercial urea-formaldehyde +water | Per cent 50 | 140–25 | 80–5 |
| N. Example I | 45 | 260–80 | 150–4 |

The animal protein-urea-formaldehyde products of this invention clearly are reaction products of the three ingredients used and are not to be confused with urea-formaldehyde resins to which various extenders have been added, or with other mixtures of the ingredients that have not been reacted together by a condensation type of reaction. The exact chemical composition of the products is exceedingly difficult to determine because of its complexity, but the distinctive nature thereof is evidenced by the properties which they exhibit. One of the distinctive properties of these new reaction products is their high bonding strength coupled with good spreading qualities and viscosity in relatively dilute aqueous solutions. Also, these glues have a much longer useful life when stored at temperatures above 70° F., and produce a more flexible glue film as compared with the usual straight urea-formaldehyde resin glues.

These glues are very economical to prepare because they can be made with good viscosity and strength without evaporating water during their preparation. Of course, the fact that large quantities of inexpensive extenders such as rye flour can be mixed with these new glues without seriously impairing their strength is also an important factor in providing a high quality glue at low cost.

While the reaction products described herein are particularly suited for use as adhesives in the wood gluing field, they are also suitable for other purposes such as gluing other materials together and for finishing or sizing paper, cloth and the like. Large quantities of water can be added if it is desired to make a very thin glue solution for spraying as a coating or sizing on paper or textiles.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A water soluble urea-formaldehyde type of resin product comprising a reaction product prepared by heating to approximately refluxing temperature about 1.7 to about 2.2 mols of formaldehyde for each mol of urea together with a fluid aqueous solution of a reaction product of an animal protein and urea until a thick viscous liquid is obtained.

2. A thermo-setting resin type of glue comprising a liquid reaction product prepared by mixing and condensing at approximately refluxing temperature fluid aqueous solutions of formaldehyde and of a reaction product of a water soluble animal protein with urea, the proportion of formaldehyde being about 1.7 to about 2.2 mols for each mol of urea, and the condensation reaction being continued until a thick viscous resin product is obtained.

3. A glue as defined in claim 1 in which the animal protein is albumin.

4. A glue as defined in claim 1 in which the animal protein is collagen.

5. A glue as defined in claim 1 in which the animal protein is fish glue.

6. A water soluble thermo-setting resin product prepared by refluxing a fluid aqueous solution of a water soluble animal protein and urea with about 1.7 to about 2.2 mols of formaldehyde for each mol of urea, adjusting the pH of the solution at the start of said condensation to about 5.5 to about 7, and neutralizing the product when a thick liquid resinous reaction product is obtained.

7. A water soluble, thermo-setting glue prepared by mixing together in aqueous solution an animal protein and a urea, adding formaldehyde, adjusting the pH of the mixture to about 7, heating said mixture to effect a partial reaction between the ingredients, adjusting the pH of the reacted mixture to a value below 7 but not substantially below 5.5, refluxing the reacted mixture to produce a condensation reaction, and neutralizing the product when a viscous liquid resin is obtained.

8. A thermo-setting resin type of condensation product comprising an aqueous solution containing less than about 50% of solids and prepared by refluxing aqueous solutions of a reaction product of a water soluble animal protein and urea with formaldehyde without evaporation of substantial quantities of water until a viscous reaction product is obtained, the proportion of formaldehyde being about 1.7 to about 2.2 mols for each mol of urea.

9. A method of preparing an aqueous solution of a resin type glue comprising mixing in aqueous solution an animal protein and urea, heating at approximately refluxing temperature said solution with formaldehyde without evaporation of substantial quantities of water therefrom until a heavy viscous reaction product is obtained, and neutralizing said product, the proportion of formaldehyde being about 1.7 to about 2.2 mols for each mol of urea.

10. A method of preparing a glue as defined in claim 9 in which the animal protein is albumin.

11. A method of preparing a glue as defined in claim 9 in which the animal protein is collagen.

12. A method of preparing a glue as defined in claim 9 in which the animal protein is fish glue.

13. A method of preparing a water soluble, thermo-setting adhesive comprising refluxing in aqueous solution a reaction product of a water soluble type of animal protein and urea with formaldehyde, adjusting the pH of the liquid at the start of the condensation to below 7 but not substantially below 5.5, and neutralizing and cooling the product when a thick liquid resinous product is obtained, the proportions of formaldehyde being about 1.7 to about 2.2 mols for each mol of urea.

14. A method of preparing a water soluble, thermosetting adhesive comprising mixing together in aqueous solution an animal protein, and a urea, adding about 1.7 to about 2.2 mols of formaldehyde for each mol of urea, adjusting the pH of the mixture to about 7, heating said mixture to effect a partial reaction of the ingredients thereof, adjusting the pH of the reacted mixture to a value below 7 but not substantially below 5.5, refluxing said reacted mixture until a viscous liquid reaction product is obtained, and neutralizing and cooling said product.

CARL S. LEONARDSON.
DONALD J. WHITE.

CERTIFICATE OF CORRECTION.

Patent No. 2,332,802.                                                October 26, 1943.

CARL S. LEONARDSON, ET AL.

It is hereby certified that error appears in the printed specification of the above numbered patent requiring correction as follows: Page 1, first column, line 2, before "urea" insert --a--; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.